United States Patent [19]

Sugimoto

[11] Patent Number: 4,675,521

[45] Date of Patent: Jun. 23, 1987

[54] TROLLEY APPARATUS FOR TRANSMITTING LIGHT SIGNALS

[75] Inventor: Hiroshi Sugimoto, Kobe, Japan

[73] Assignee: Mitsubishi Denki Kabushiki Kaisha, Tokyo, Japan

[21] Appl. No.: 784,005

[22] Filed: Oct. 4, 1985

[30] Foreign Application Priority Data

Oct. 4, 1984 [JP] Japan .............................. 59-207011

[51] Int. Cl.⁴ ........................... H01J 5/16; G02B 6/26
[52] U.S. Cl. .................................. 250/227; 250/551; 350/96.15
[58] Field of Search ............... 250/551, 227; 350/96.1, 350/96.15–96.19, 96.29, 96.32; 356/73.1; 191/56; 455/602, 610, 612

[56] References Cited

U.S. PATENT DOCUMENTS 428,748   5/1890  Fike et al. .......................... 191/56
4,165,913  8/1979  Fitch ................................. 350/96.15
4,253,727  3/1981  Jeunhomme et al. ....... 350/96.29 X

*Primary Examiner*—Eugene R. LaRoche
*Assistant Examiner*—David Mis
*Attorney, Agent, or Firm*—Sughrue, Mion, Zinn, Macpeak and Seas

[57] ABSTRACT

A transparent optical cable 5 including a flexible core 5a and a flexible but stiffer cladding 5b transmits light signals axially through the core. When a transparent contact plate 7 or roller 10 depresses and flatteningly distorts the cable, the light signals leak out through the core-cladding interface at the depressed portion and are transmitted through the plate or roller to a photoelectric transducer 8 or 12 mounted on the plate or proximate the roller on a movable object 1, which converts the light signals to electrical signals. Signal transmissions into the cable are also possible, and the input-output signal coupling depression may be made at any point along the length of the cable.

3 Claims; 5 Drawing Figures

TROLLEY APPARATUS FOR TRANSMITTING LIGHT SIGNALS

BACKGROUND OF THE INVENTION

This invention relates to an apparatus for transmitting light signal to and from a movable trolley or the like via a fiber optic cable at any point along the cable.

Fiber optic transmission cables have the advantages of low transmission loss, wide bandwidth, light weight, insensitivity to induced electromagnetic signals, and small size over electrical wires or cables, but they cannot receive and/or transmit light signals at any point except their ends or junctions. With current usage of optical cables it is necessary that they be branched off to enable the control of an optical, heat, electrical, or power source, or a robot device.

FIG. 1 shows a prior art arrangement in which an optical cable is used to supply signals to a movable object, such as a robot. A flexible optical cable 2 is connected to a movable object 1, and a stationary optical cable 4 is connected to the flexible cable 2 at a fixed point 3. The cable 2 may be moved with respect to the fixed point 3. During operation, the flexible cable 2 is trailed on the floor, and is pulled out or extended as required to accomodate movements of the object 1; light signals from the stationary cable 4 are continuously supplied to the movable object 1 through the cable 2. As the movable cable 2 is repeatedly trailed on the floor it is exposed to mechanical damage, however, which greatly decreases its usable life. Further, when the object 1 moves a significant distance a large amount of the cable 2 is needed, which presents problems in its winding and unreeling.

SUMMARY OF THE INVENTION

An object of the present invention is to provide an apparatus in which light signals can be extracted from or injected into an optical cable at any point along its length. This object is accomplished by providing an optical cable made of transparent elastic materials, a transparent contact member mounted on a movable object and depressable against the cable to temporarily distort it such that light signals may be extracted from and/or injected into the optical cable at the point of depression and a photoelectric transducer mounted on or proximate the contact member in the deflected path of the light signals.

DETAILED DESCRIPTION OF THE PREFERRED EMBODIMENTS

Figure 1:
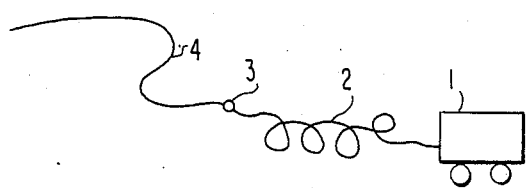
FIG. 1 is a schematic diagram of a conventional trolley apparatus for transmitting light signals.
Figure 2:
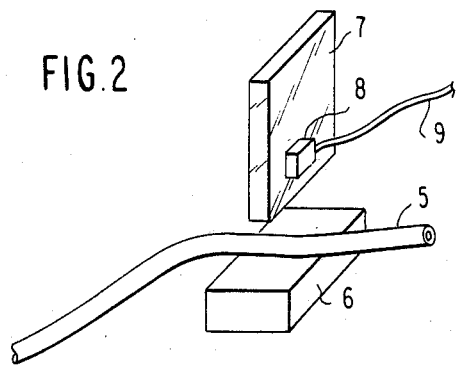
FIG. 2 is a schematic diagram of an apparatus for transmitting or receiving light signals in accordance with the present invention.
Figure 3:
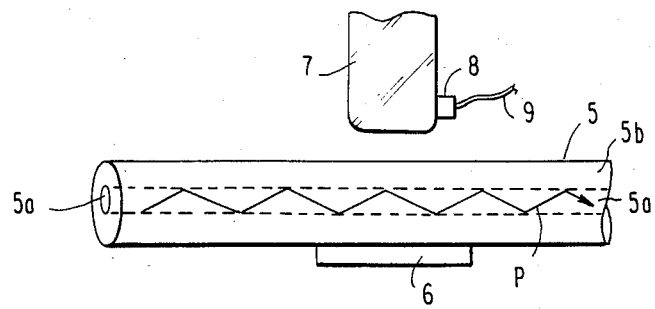
FIG. 3 is a front view of the apparatus shown in FIG. 2.

FIGS. 2 and 3 show one embodiment of the invention, wherein an optical cable 5 rests on a receiving or base plate 6. The cable 5 has a high refractive index core 5a surrounded by a comparatively low refractive index cladding 5b, both made of elastic and flexible materials. Such cables are well known and freely commercially available on a wide scale. Although their comparatively high loss or signal attenuation characteristics render them unsuitable for most long distance, low amplitude communication systems, they are quite acceptable in many industrial environments where the transmission distances involved are relatively small.

A recriprocable contact member 7 made of a transparent material, such as glass, is disposed opposite the plate 6 above the cable. The contact member 7 and base plate 6, which are both preferably mounted on a common support (not shown), can depress the cable at any point along its length, thereby temporarily changing or distorting the normal shape of the cable. The contact member and associated base plate are carried on a movable object, such as an industrial robot or the like. A photoelectric transducer 8, which can selectively function as either a light receiving element or an optical source is fixed at a suitable place on the contact member 7. A lead wire 9 is connected to the transducer.

In FIG. 3, when the cable 5 is not depressed by the contact member, light signals P pass axially through the core 5a from one end to the other. The light signals are totally reflected by the interfacing between the core and the cladding 5b, and thus remain confined within the cable.

Figure 4:
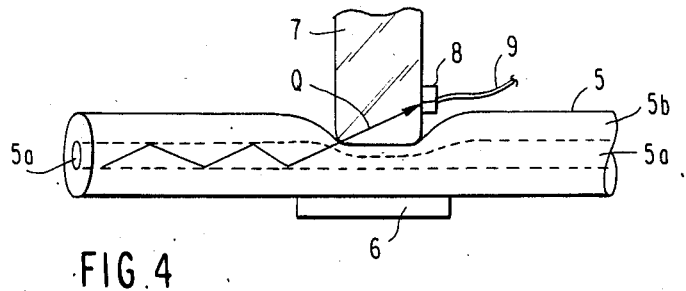
FIG. 4 is a front view showing a contact member depressing the optical cable in accordance with the present invention.

On the other hand, when the cable 5 is pinched or depressed by the contact member 7 as shown in FIG. 4, the core and the cladding flex to such an extent that at least part of the light signals passing through the core leak out through the cladding across the interface because they strike the interface at a more direct or supercritical angle. The escaping light signals Q pass through the transparent contact member and are received by the photoelectric transducer 8, which converts them into electrical signals. Conversely, when the transducer is used as an optical source, the light signals generated thereby are injected into the core 5a through the transparent contact member 7 and the cladding 5b. When the contact member is lifted from the cable it recovers its origional shape due to its elasticity.

The above embodiment is described as having the contact member more or less fixed at a suitable position on the optical cable, but it may also be constructed to be slidable or movable therealong to accommodate corresponding movements of the robot or other controlled apparatus.

Figure 5:
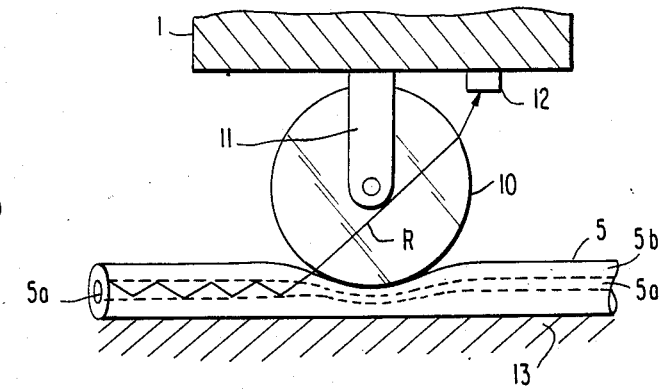
FIG. 5 is a schematic diagram of a trolley apparatus for transmitting or receiving light signals in accordance with the invention.

FIG. 5 shows another embodiment of the invention in which a movable contact member is used. In FIG. 5, a contact roller 10 constructed of transparent material, such as optical glass, is mounted on a bearing support 11 to rotate freely. The support 11 is mounted on a movable object 1. A photoelectric transducer 12 is fixed to the object 1 at a position at which it will receive and/or emit the light signals. An optical cable 5 rests on the floor 13. As the cable 5 is depressed towards the floor by the transparent contact roller 10 the core 5a and the cladding 5b are flexed, whereby at least part of the light signals passing through the core 5a leak out through the cladding 5b. The portion through which the light signals leak out is the section whereat the most flexing or distortion of the cable takes place. The light signals R emerging from the cable 5 pass through the transparent contact roller 10, and impinge on the photoelectric transducer 12. If the object 1 moves along the cable, the contact roller is also moved.

Thus, although the roller 10 always depresses the optical cable 5 when either moving or stationary, the relative position of the transducer 12 with respect to the contact roller and the flexed portion of the cable 5 remains constant. Accordingly, the light signals are always extracted from and/or injected into the optical cable in a positive and stable manner. As but one alternative, an opposed pair of contact rollers may be provided to pinch the optical cable 5 in a nip between them.

In order that the light signals may be eaily extracted from and/or injected into the optical cable 5 with only a slight depression of the cable by the contact roller 10, it is desirable that the core 5a is made of softer and more flexible materials than the cladding 5b.

What is claimed is:

1. A trolley apparatus for transmitting light signals to and from a movable object (1), comprising:
   (a) a transparent optical cable (5) made of elastic materials and comprising a central core (5a) and an outer cladding (5b) surrounding the core, wherein the core is softer and more flexible than the cladding,
   (b) transparent contact means (10) mounted on said movable object and movable relative to said cable for depressing said optical cable to flatteningly distort its normally circular cross-sectional shape such that light signals may be extracted from and/or injected into said cable through an axially bent interface between the core and the cladding at a zone of depression thereof, and
   (c) a photoelectric transducer (12) fixed proximate said contact means for receiving extracted light signals transmitted through the contact means and/or emitting light signals for injection through the contact means and into said optical cable,
   (d) wherein said contact means is a transparent roller movable along said optical cable.

2. An apparatus in accordance with claim 1, wherein the transducer is mounted on the movable object at a position such that it intercepts light signals extracted from the depressed cable and transmitted through the transparent contact roller.

3. An apparatus in accordance with claim 1, wherein the contact means depresses the cable exclusively on one side thereof.

* * * * *